O. WORTMANN.
ELECTRICAL PROTECTIVE DEVICE.
APPLICATION FILED JULY 12, 1917.

1,432,006.

Patented Oct. 17, 1922.

WITNESSES:
Felix C. Rodgers
J. M. Procter

INVENTOR
Otto Wortmann
BY
Chesley G. Carr
ATTORNEY

Patented Oct. 17, 1922.

1,432,006

UNITED STATES PATENT OFFICE.

OTTO WORTMANN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE DEVICE.

Application filed July 12, 1917. Serial No. 180,048.

*To all whom it may concern:*

Be it known that I, OTTO WORTMANN, a citizen of the United States, and a resident of Wilkinsburg, in the county of Allegheny and State of Pennsylvania, have invented a new and useful Improvement in Electrical Protective Devices, of which the following is a specification.

My invention relates to electrical protective devices and particularly to means for protecting vacuum-electric apparatus.

One object of my invention is to provide means for disconnecting a vacuum-electric apparatus from an electric circuit when a short circuit obtains in the apparatus.

Another object of my invention is to provide a protective device of the above indicated character that shall be simple to construct and efficient in its operation.

Figure 1:
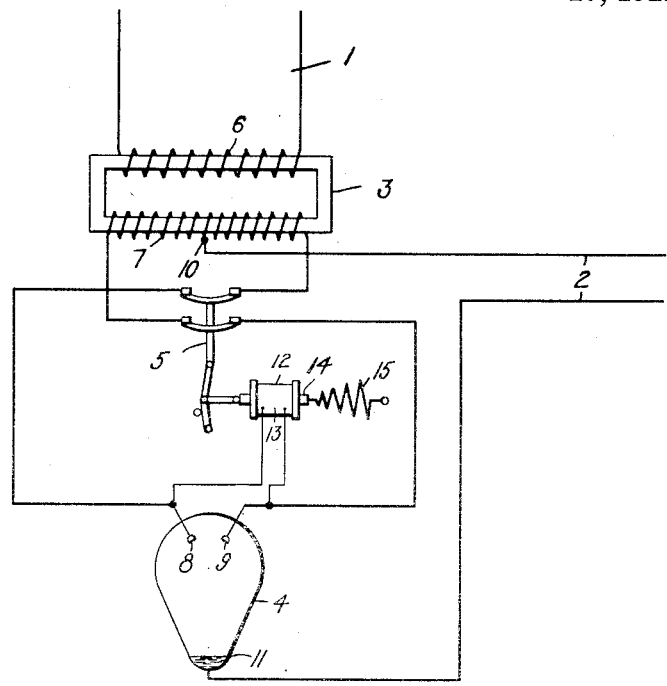
Figure 2:
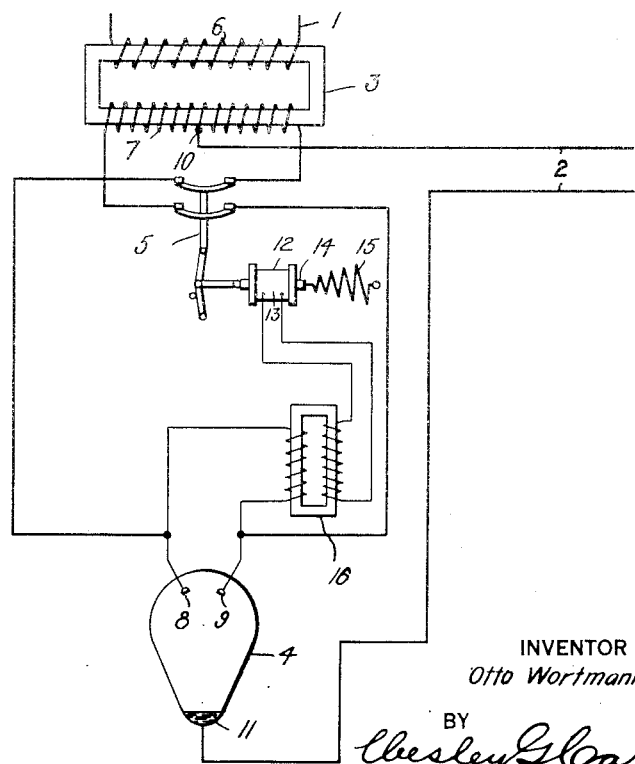

Figure 1 of the accompanying drawings is a diagrammatic view of a vacuum-electric apparatus embodying my invention, and Fig. 2 is a diagrammatic view of a vacuum-electric apparatus embodying a modified form of my invention.

An alternating current circuit 1 is adapted to supply current to a direct-current circuit 2 through a transformer 3 and a rectified or vacuum-electric apparatus 4 that is protected by a circuit interrupter 5.

The circuit 1 is connected to the primary winding 6 of the transformer 3, the secondary winding 7 of which is connected through the circuit interrupter 5 to the anodes 8 and 9 of the rectifier 4. The mid point 10 of the secondary winding 7 is connected to one conductor of the direct-current circuit 2 and the cathode 11 of the rectifier 4 is connected to the other conductor of the circuit 2. The circuit interrupter 5 is provided with a low-voltage tripping device 12 that comprises a winding 13, a magnetizable core member 14 and a spring 15. The winding 13 of the tripping device 12 is connected across the anodes 8 and 9 and is so proportioned that it is adapted to hold the interrupter 5 in its closed position under normal conditions. That is, when the voltage across the anodes 8 and 9 is equal to the voltage across the secondary winding 7 of the transformer 3, under normal conditions in the rectifier 4, sufficient force is imparted to the movable core member 14 to overcome the pull of the spring 15 and to hold the interrupter in its closed position.

When a short circuit obtains across the anodes 8 and 9 of the rectifier 4, the voltage thereacross will drop because the secondary winding 7 is substantially short-circuited and, as is the case in any ordinary transformer, its voltage will be materially reduced under such short-circuit conditions. When the voltage across the anodes 8 and 9 is reduced, the spring 15 overcomes the pull of the winding 13 and permits the circuit interrupter 5 to be opened thus disconnecting the rectifier 4 from the circuit 1.

Frequently, the voltage across the anodes 8 and 9 is relatively high and in view of this, I provide a potential transformer 16 that I connect between the winding 13 of the tripping device 12 and the anodes 8 and 9. The operation of this modified form of my invention is substantially the same as that set forth with respect to the device shown in Fig. 1 of the drawings.

I do not limit my invention to the particular form of rectifier and low-voltage tripping device shown as various modifications may be made without departing from the spirit and scope of my invention as set forth in the appended claims.

I claim as my invention:

1. The combination with a transformer and a rectifier operatively connected thereto, of a circuit interrupter connected between the rectifier and the transformer, and means dependent upon the potential drop across the anodes of the rectifier for controlling the circuit interrupter.

2. The combination with a power circuit, a vapor converter, and a circuit interrupter for disconnecting the converter from the power circuit, of means dependent upon the drop in potential across certain of the electrodes of the converter for controlling the circuit interrupter.

3. The combination with a power circuit, a vacuum-electric apparatus, and a protective device for the power circuit, of means connected across certain of the electrodes of the apparatus for controlling the protective device.

4. The combination with a transformer and a rectifier operatively connected thereto, of a circuit interrupter connected between the rectifier and the transformer, and means dependent upon the potential drop across certain of the electrodes of the rectifier for controlling the circuit interrupter.

5. The combination with a transformer, a vacuum-electric apparatus and a circuit interrupter connected therebetween, of means dependent upon a short-circuit across the anodes of the said vacuum-electric apparatus for tripping the interrupter.

In testimony whereof, I have hereunto subscribed my name this 29th day of June, 1917.

OTTO WORTMANN.